No. 759,169. PATENTED MAY 3, 1904.
E. T. FORRESTER.
ARTIFICIAL HAND.
APPLICATION FILED FEB. 16, 1904.

NO MODEL.

Witnesses
E. F. Stewart
C. N. Woodward

Eli T. Forrester,
Inventor,
by C. A. Snow & Co.
Attorneys

No. 759,169. Patented May 3, 1904.

UNITED STATES PATENT OFFICE.

ELI TAYLOR FORRESTER, OF DEADWOOD, SOUTH DAKOTA.

ARTIFICIAL HAND.

SPECIFICATION forming part of Letters Patent No. 759,169, dated May 3, 1904.

Application filed February 16, 1904. Serial No. 193,870. (No model.)

*To all whom it may concern:*

Be it known that I, ELI TAYLOR FORRESTER, a citizen of the United States, residing at Deadwood, in the county of Lawrence and State of South Dakota, have invented a new and useful Artificial Hand, of which the following is a specification.

This invention relates to artificial hands, and has for its object to simplify and improve the construction and produce a device of this character which may be attached to any of the various forms of stump-sockets in use and having means for the independent foldable attachment of various implements useful to the wearer.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention, capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 1:
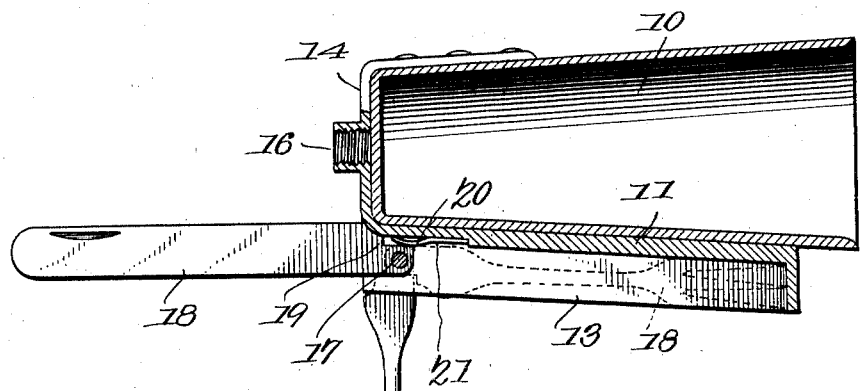
Figure 2:
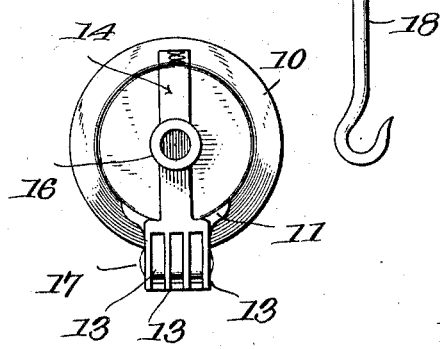
Figure 3:
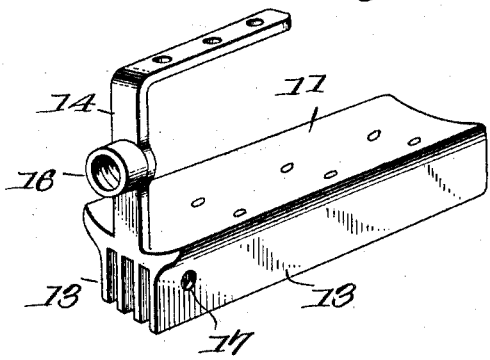

In the drawings thus employed, Figure 1 is a sectional side elevation, and Fig. 2 is an end elevation, of a stump-socket with the improvement applied. Fig. 3 is a perspective of the improved attachment removed.

The improved device is applicable to any of the ordinary forms of stump-sockets 10 in common use, and consists of a plate 11, having means, such as rivets, for attachment to the socket and provided with a plurality of longitudinally-disposed spaced ribs 13 and with a strap 14, extending over the front end opposite side of the socket and connected thereto, as by rivets.

The strap 14 is provided centrally of the outer end of the socket with a hub or supplemental socket 16, having a central aperture for the reception of the butt-end of any approved form of implement in which it may be screwed or otherwise secured.

Pivoted at 17 between the forward ends of the ribs 13 are various implements 18—such as knives, forks, spoons, hooks, or the like—any desired number being employed and of any desired form.

Each of the implements will be provided with a stop-shoulder 19 and a square shoulder 20, and in each channel formed by the spaced ribs a stop-spring 21 is secured, as by rivets, and bearing against the square shoulders 20 and engaged at their free ends by the stop-shoulders 19. By this arrangement it will be obvious that when the implements are projected the stop-springs will bear against the square shoulders and maintain them yieldably in their projected positions, and then when folded between the ribs the stop-springs, by bearing upon the opposite sides of the implements, will likewise retain them yieldably in closed position. The stop-springs will also bear upon the square inner ends of the implements when half open and retain them yieldably in that position or at right angles to the longitudinal line of the socket and plate. This intermediate position will be found very convenient for some forms of the implements when employed for certain purposes.

As before stated, any desired form of implement may be connected into the channels between the ribs and employed for any purpose, and I do not, therefore, desire to be limited to the employment of any particular form of implement.

For the purpose of illustration a knife and a rod terminating in a hook are shown connected to the plate; but any number of the ribs 13 may be employed to support any desired number of the implements. The plate 11 and its rib 13 and strap 14 will preferably be of one piece of metal, forged or otherwise constructed, and will preferably be of steel and of any suitable size and plated or otherwise ornamented, as may be desired. The socket 10 will be provided with the usual means, such as adjustable straps, for connection to the person of the wearer; but as the construction of these devices are so well known and as they form no part of the present invention they are not illustrated. It will be noted by this arrangement of parts that a very compact, convenient, and durable attachment is produced from which the implements may be quickly projected for use as required and into which they may be folded when not in use.

Having thus described the invention, what is claimed is—

1. In an artificial hand, a plate for attachment to the stump-socket and having spaced longitudinal ribs, and implements pivotally connected between said ribs for projection from said plate and foldable between said ribs.

2. In an artificial hand, a plate for attachment to the stump-socket and having spaced longitudinal ribs, and implements pivotally connected between said ribs for projection from said plate and foldable between said ribs, said implements having shoulders engaging the plate and limiting the projected movement.

3. In an artificial hand, a plate for attachment to the stump-socket and having spaced longitudinal ribs, implements pivotally connected between said ribs for projection from said plate and foldable between said ribs, and yieldable stops for supporting said implements in their projected and folded positions.

4. In an artificial hand, a plate for attachment to the stump-socket and having spaced longitudinal ribs, implements pivotally connected between said ribs for projection from said plate and foldable between said ribs, yieldable stops for supporting said implements in their projected and folded positions and at one or more intermediate positions.

5. In an artificial hand, a plate for attachment to one side of the stump-socket and having a projecting strap for attachment across the front and the opposite side of the socket and having spaced longitudinal ribs, and implements pivotally connected between said ribs for projection therefrom and foldable between the same.

In testimony that I claim the foregoing as my own I have hereto affixed my signature in the presence of two witnesses.

his
ELI TAYLOR × FORRESTER.
      mark.

Witnesses:
 JOHN BAGGALEY,
 A. H. STILWILL.